(12) United States Patent
Emelyanov et al.

(10) Patent No.: US 10,681,008 B1
(45) Date of Patent: Jun. 9, 2020

(54) USE OF CHECKPOINT RESTORE IN USER SPACE FOR NETWORK SOCKET MANAGEMENT

(71) Applicant: Virtuozzo International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 290 days.

(21) Appl. No.: 15/838,581

(22) Filed: Dec. 12, 2017

(51) Int. Cl.
*H04L 29/06* (2006.01)
*H04L 12/24* (2006.01)

(52) U.S. Cl.
CPC ...... *H04L 63/0254* (2013.01); *H04L 41/0672* (2013.01); *H04L 41/0853* (2013.01); *H04L 63/0236* (2013.01); *H04L 63/0263* (2013.01)

(58) Field of Classification Search
CPC .................................................. H04L 63/254
USPC .......................................................... 726/11
See application file for complete search history.

(56) References Cited

U.S. PATENT DOCUMENTS

| 7,171,492 B1* | 1/2007 | Borella | H04L 69/16 709/245 |
| 2009/0228972 A1* | 9/2009 | Bandi | G06F 21/54 726/14 |
| 2015/0049769 A1* | 2/2015 | Tamir | G06F 13/00 370/412 |

* cited by examiner

*Primary Examiner* — Jacob Lipman
(74) *Attorney, Agent, or Firm* — Bardmesser Law Group

(57) ABSTRACT

A computer-implemented system for network socket management includes a host having a plurality of sockets and a hash table (data structure) storing data on network connections corresponding to the sockets; a firewall with a plurality of rules for routing incoming packets to the sockets; a socket image file that stores a state of each suspended socket. A network connection corresponding to the suspended socket is maintained open. A filter that monitors incoming packets and restores suspended sockets to active status when a packet for the suspended socket is received. The filter is implemented as part of the firewall, or as a hardware front end. The sockets, the firewall and the socket image file are all maintained in user space.

22 Claims, 6 Drawing Sheets

State 1 – active connection

State 2 – socket is suspended

State 3 – socket restore upon receiving a packet

USE OF CHECKPOINT RESTORE IN USER SPACE FOR NETWORK SOCKET MANAGEMENT

BACKGROUND OF THE INVENTION

Field of the Invention

This invention relates to management of network sockets for servers that maintain a large number of live connections.

Description of the Related Art

One common situation in a client-server environment is the case of a server or a set of servers that experience a very high number of long-lived connections, for example, long-lived TCP protocol connections. These can be, for example, servers of a search engine, servers of a social network, or, in some cases, servers or a server of a frequently visited news website, or similar. In some cases, the number of such long-lived connections can be in the hundreds of thousands, and as of 2017, may be approaching one million connections. The problem with this is that each such a connection requires a socket, and each socket consumes a certain amount of resources. For example, each socket requires a memory allocated to it. Also, the server maintains a hash table of all the connections and the socket information for each such connection (such as port-address pairs, protocol specific connection characteristics, etc.). The larger the hash table, the slower the search for a particular socket, which in turn affects the overall performance of the server.

Conventionally, this problem is normally dealt with by migrating a particular socket to a different hardware node, when there are too many sockets on a single node. However, there may be a situation where there is simply no free node available. Another issue is that many such sockets deal with connections that are in effect inactive—in other words, the connection is opened, but there are no packets being transferred back and forth between the client and the server over the connection. Nevertheless, the kernel is forced to keep all the sockets in a hash table, and use the incoming packets in order to identify the socket to which the packet belongs. The structure used to search, the hash table, becomes overloaded, and the presence of inactive connections and inactive sockets slows down performance. Therefore, the removal of the inactive connections from the hash table will reduce the load on the CPU.

However, simply closing the connection is often improper, since the client may still come in with a new request or a packet (the server does not know whether the client intends to do that, or whether the client no longer has any need for the connection, in the absence of an explicit closing of the connection by the client), and, in this case, the newly received client request will be directed to a socket that is closed. This means that a connection that the client actually expects to be open is not open, and the server therefore behaves in a manner that the client does not expect.

Therefore, there is a need in the art to remove sockets from hash table in a manner that does not "lose" the client, from the server perspective.

SUMMARY OF THE INVENTION

Accordingly, the present invention is directed to a system and method for management of network sockets, that substantially obviates one or more of the disadvantages of the related art.

In one aspect of the invention, a computer-implemented system for network socket management includes a host having a plurality of sockets and a hash table (or, more generally, a data structure, which can also be a tree, a B-tree, an RB tree, a radix tree, an AVL tree), and a flat-simple-list) storing data on network connections corresponding to the sockets; a firewall with a plurality of rules for routing incoming packets to the sockets; a socket image file that stores a state of each suspended socket. A network connection corresponding to the suspended socket is maintained open. A filter that monitors incoming packets and restores suspended sockets to active status when a packet for the suspended socket is received. The filter is implemented as part of the firewall, or as a hardware front end. The sockets, the firewall and the socket image file are all maintained in user space.

In another aspect, there is provided a system and method for network socket management, including a host having a plurality of sockets and a data structure storing data on network connections corresponding to the sockets; and a socket image file that stores a state of each suspended socket. The socket(s) is (are) suspended when an analyzer module determines that the socket is a candidate for suspension based on connection behavior or socket behavior. A network connection corresponding to the suspended socket is maintained open without removing the corresponding socket from the data structure. A filter monitors incoming packets and restores suspended sockets to active status based on input from the analyzing module that is based on the connection behavior or the socket behavior.

The socket/network connection behavior based on which the socket can be suspended is, e.g., when no packets are received on its corresponding connection for a predetermined period of time, and/or based on a predefined priority, and/or based on a least recently used algorithm applied to all the sockets to determine inactivity, and/or when its data rate is lower than all the other sockets, and/or when a DDOS attack is detected, and/or based on its port number, and/or when a range of ports is suspended.

The socket can be restored based on socket/network connection behavior or events, such as when the analyzing block detects an incoming packet for the socket, or restored preemptively when resources are available, or restored when a range of ports is restored.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
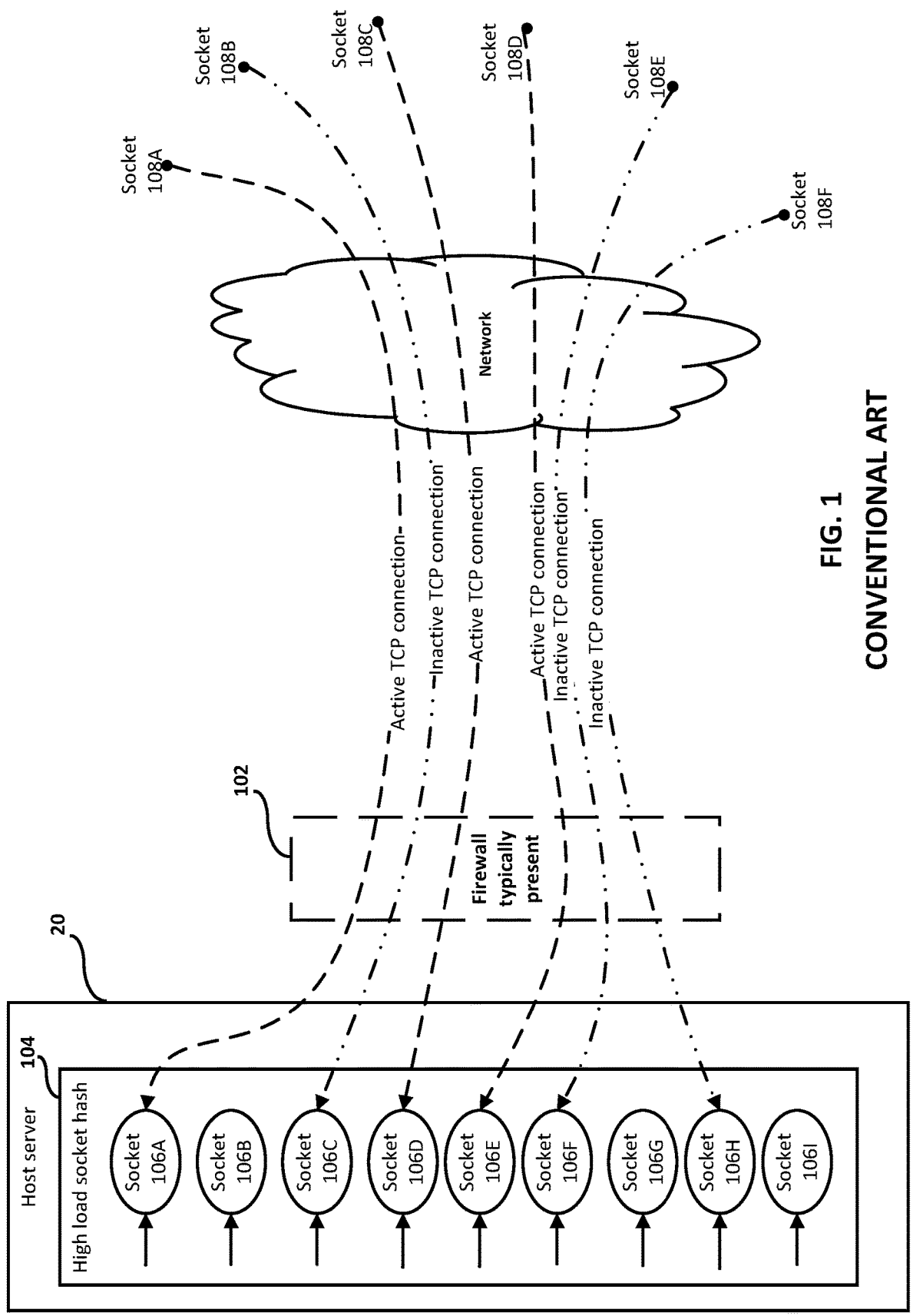
FIG. 1 illustrates a conventional scheme for handling connections.

Reference will now be made in detail to the preferred embodiments of the present invention, examples of which are illustrated in the accompanying drawings.

The solution to the above problem is to remove sockets from hash table (i.e. "close") in a manner that doesn't lose the client to the server. Thus, the socket on the server side is closed, however, no TCP protocol (or similar) information to that effect is sent to the client. (I.e. the connection is maintained opened.) This means that the client continues to believe that the connection is open and functioning, and does not know that on the server side, the socket has already been killed or suspended. Thus, if the client wishes to send packets to the server at some point in the future, it can do that, without having to (from its perspective) reestablish the connection. (E.g. if queried, the server does not respond that the connection is closed.)

In this scenario, at some point, a server receives a first packet from the client, through a connection whose socket has been closed (or suspended). Rather than responding to the client that the connection does not exist (which would be the conventional response), a CRIU (Checkpoint Restore In Userspace) library LIBSOCR (library for socket checkpoint restore, see https:criu.org/Libsoccr, https:github.com/xemul/criu/tree/master/soccr) permits recovering a socket from a state near non-existence (e.g., from a snapshot, or checkpoint). Thus, if there are too many sockets on a particular server, it is fairly straightforward to identify, which of those sockets (and their corresponding connections) show only modest activity, or no activity at all, and these sockets can therefore be suspended ("killed") (e.g., snapshotted and deleted from hash table) with the aid of LIBSOCR, which preserves their state (as an image on disk).

At the server input, a filter is added, which works faster than a standard search. The filter filters the incoming packets so that the receipt of a packet directed to a suspended socket triggers the recovery of the socket, to a state that the socket had prior to the suspension. The LIBSOCR implements the technology for disassembling the state of the TCP socket, and reassembling the socket back together—which can be used for the suspension and recovery of the socket.

Thus, this permits redistributing the load, reducing the size of the hash table and, in many cases, reducing the load on the CPU. With some of the sockets being suspended, and therefore removed from the hash table of sockets, some of the load is transferred from the hash table to the filter (which can be implemented as part of a firewall), which intercepts the first packet that is directed to a suspended connection, and then triggers (e.g., causes) the recovery of the socket and the connection. Reducing the number of sockets in hash table (or any other data structure used for finding sockets) reduces the time needed for finding each socket in it, and therefore reduces the CPU load on the whole server.

Generally, the filter itself can be implemented as part of a firewall (which can also be a separate module, a front end or be a part of a host server), can be implemented as a standalone front end, can be implemented as another, less powerful hardware node that is used primarily to pass through traffic, and then, when it sees a packet to a suspended connection, it signals the server that the socket needs to be recovered. From the client perspective, this is entirely transparent; however, this scheme permits a more robust balancing of the load experienced by the server's CPU.

Thus, the present invention is applicable to both an individual server and to a group of servers that form a cluster. Consider a server that receives requests from clients, for example, for video or for web pages. If a server sees that it is overloaded, then the same request to the same http address can be redirected to a different IP address that is hosted on a different node of a cluster. Conventionally, if a user wants something from http:**Google.com/, then a load balancer can look at the URL, parse it and check that the "something" client is looking for used to be at one IP address, and now, given that the IP address is overloaded, can redirect the client request to a different IP address. In the present invention, LIBSOCR can arrange it so that the IP address in the request can always be the same, but the response will be generated from different servers (i.e., different nodes of the cluster, with each node having the socket hash table and each server managing the sockets as described herein).

From a client's perspective, each such request is serviced in an atomic manner. Thus, if a client with a request for a web page is given access to a particular web server, then, until the server finishes processing the request, this client cannot be transferred to a different hardware node, but all this is only balanced because the web is structured around a relatively small requests. With LIBSOCR, even such small requests can be balanced on the fly. Thus, if a client is downloading an image or a video, and in the middle of the downloading process the server sees that the load has increased, the entire socket can be transferred to a different hardware node, the client will continue downloading the file that it was downloading before, but now from a different server—and from the client's perspective, this will be entirely transparent.

One way to determine that a connection is inactive is by the fact that no packets have been received in the last minute, or by sorting all connections based on time of last packet received, and retain only the most recent 10% (for example) of connections (a type of LRU algorithm), or based on a predefined priority of the socket(s). Other mechanisms may also be used, e.g., because data rate on a connection is very low and lower than all the others, when a DDOS attack is detected, also, a socket can be suspended based on a policy that relies on port number, for example, when some range of ports is suspended. A software module or analyzing block can be dedicated to the determination to suspend (or not) a socket, and to unsuspend (or not) a socket (e.g. based on connection behavior or socket behavior).

For a suspended socket, no information is sent to the client to indicate that the connection has changed, a process of closing the connection is not initiated, and, if queried, the server does not respond that the connection is closed.

A socket can be un-suspended based on a received packet or some other rule, for example, multiple packets have been received, and they were in a queue, or too many packets were previously dropped, and it's time to react to all these incoming packets. Generally, this is somewhat analogous to a timeout concept. Another option is when resources are available now, so to speed up, the socket is preemptively restored.

FIG. 1 illustrates a conventional scheme for handling inactive sockets and connections. As shown in FIG. 1, on a server (or group of servers, or cloud) 20, a socket hash table 104 is maintained, which manages sockets 106A-106I. It is not necessarily a hash table, it also can be any other data structure (such as, for example, a tree (a B-tree, an RB tree, a radix tree, an AVL tree), or even plain set of connections, or list) for storing sockets or information about connections. A firewall 102 is typically present, which controls and filters ingoing and outgoing network traffic. Of the sockets 106A-106I, sockets 106A, 106D and 106E represent active connections. These sockets can be, for example, connected to sockets 108A, 108C and 108D on the client side, through a network, such as the Internet. Sockets 106C, 106F and 106H represent inactive connections, which can be nonetheless open to, for example, sockets 108B, 108E and 108F on the client's side. Sockets 106G and 106I are not established (or not connected). If there lots of connections, then the search is the socket data structure will be slowed down.

Figure 2:
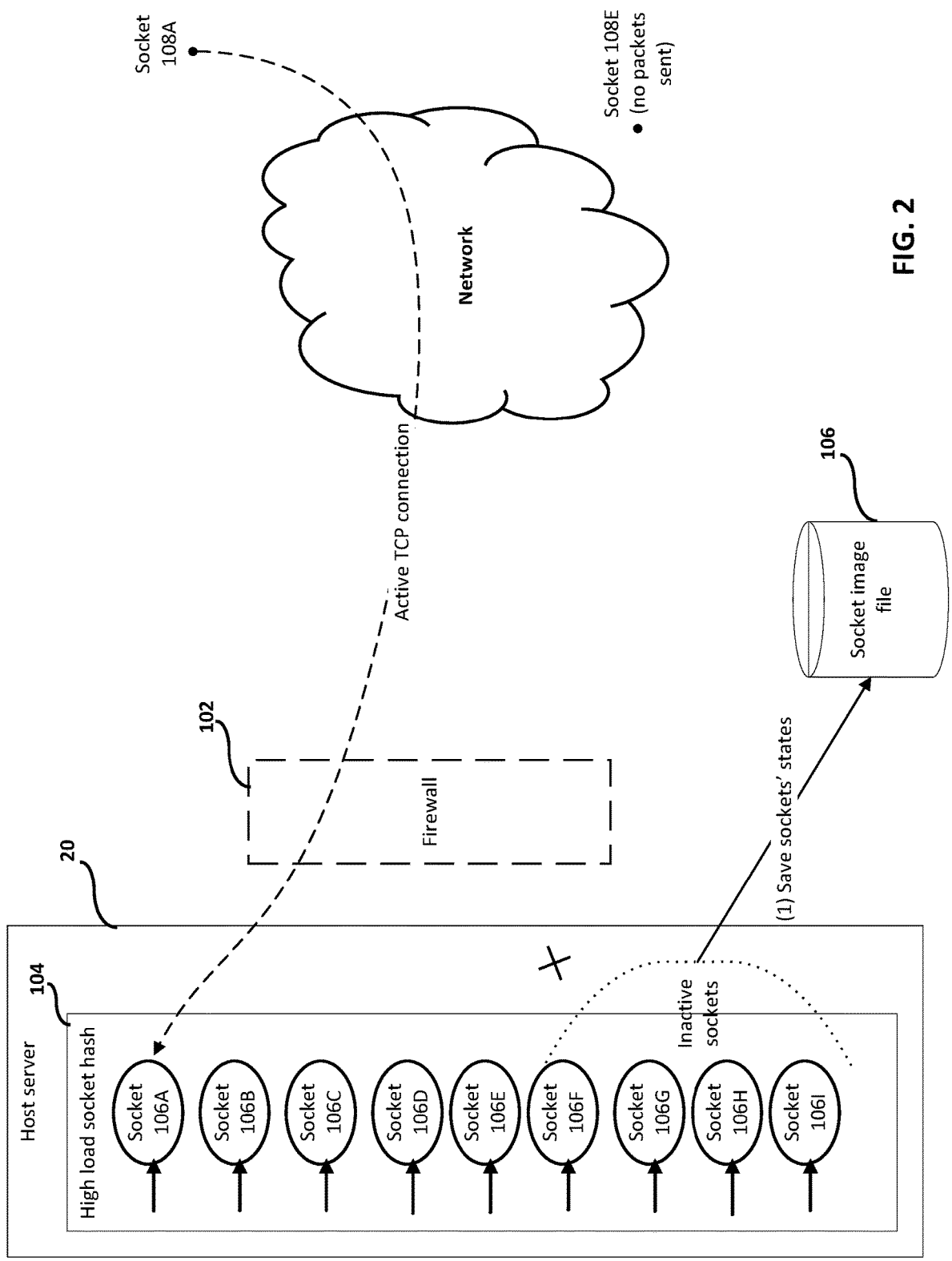
FIG. 2 and FIG. 3 illustrate suspension and recovery of sockets, according to the exemplary embodiment.
Figure 3:
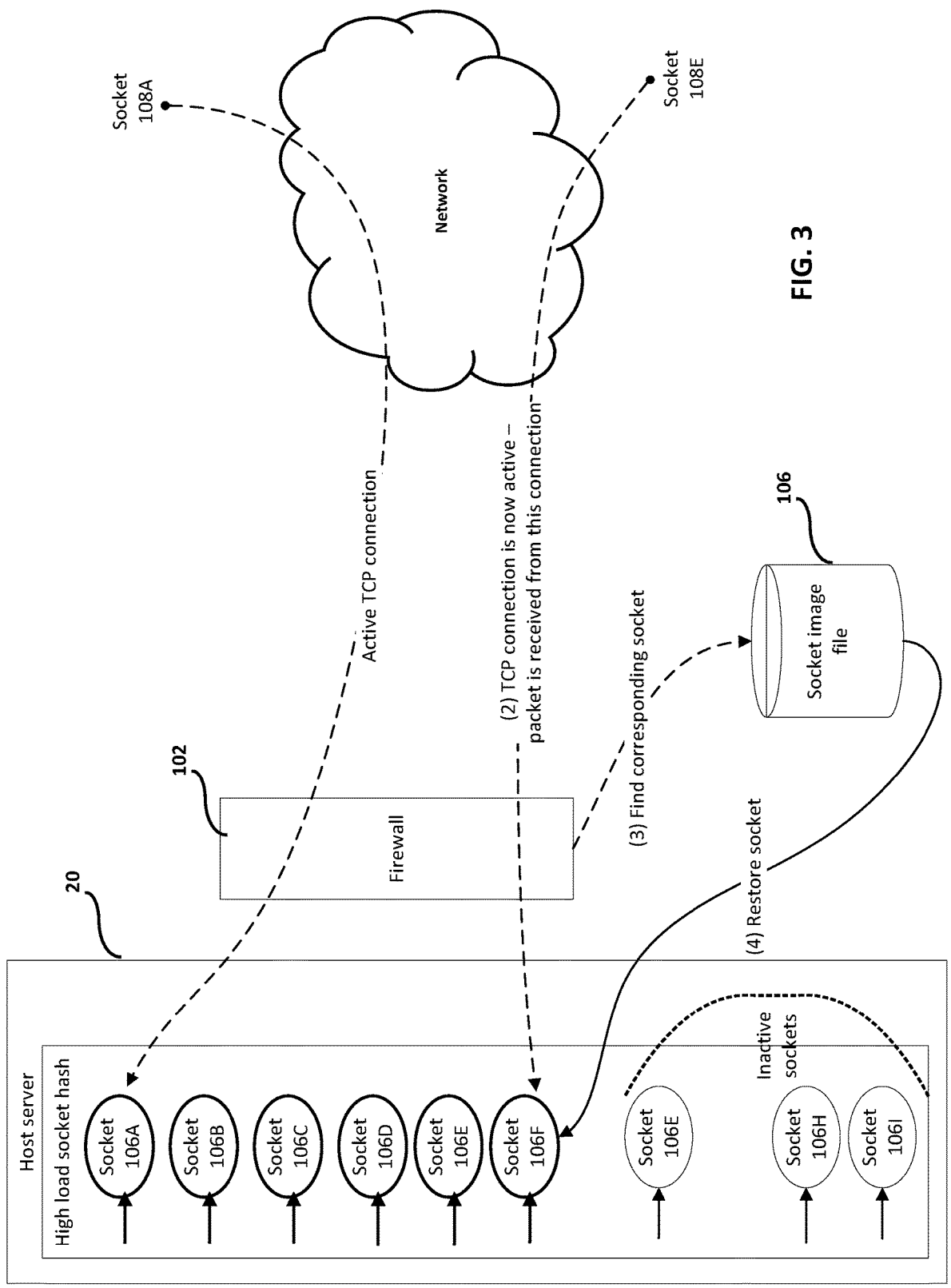

FIG. 2 and FIG. 3 illustrate the handling of sockets, suspension and recovery, according to the exemplary embodiment. As shown in FIG. 2, socket 106A has an active TCP connection to socket 108A on the client's side. Socket 108E on the client's side does not send packets. On the server side, sockets 106F, 106G, 106H and 106I are inactive, and their states are saved to the socket image files (one of such image files is 106) in step (1). In other words, at some point in time, an analyzing block decides that the connections corresponding to these sockets are inactive (based on the various possible criteria described above) and creates a checkpoint of each them (i.e., a snapshot), which is stored in the corresponding socket image files on a disk. In effect, they are removed from the socket data structure (e.g. hash table) 104, in which therefore CPU can perform faster searches and responses for the active connections. Any socket corresponding to a connection with rarely transferred packets is a candidate to be considered (by an analyzing block) as "inactive" and, so, to be "suspended", i.e. snapshotted and deleted, with a state saved to the image; but this will not necessarily happen. In FIG. 3, the analyzing block decides that the socket 108E should be restored (resumed), i.e., the corresponding connection should now be active. This is done, for example, after that, in step (2), socket 108E sent a packet through its TCP connection to the socket 106F on the server side. This means that the firewall or filter 102 gets this packet, and understands (with help of the analyzing block) that the corresponding socket (i.e. 106F) should be restored from the checkpoint. Then the host server 20, in step (3), needs to find a socket image file corresponding to the socket 106F among socket image files (e.g., 106) and restore the socket. In the next step (4), the socket is then restored to its prior state from an image. After that the socket 106F is active, is in the socket's data structure (e.g., in the hash table), and the connection is active either. Then the server can respond to the client through the connection that is now active on both sides. The inactive sockets, in this example, remain sockets 106E, 106H and 106I.

Figure 4:
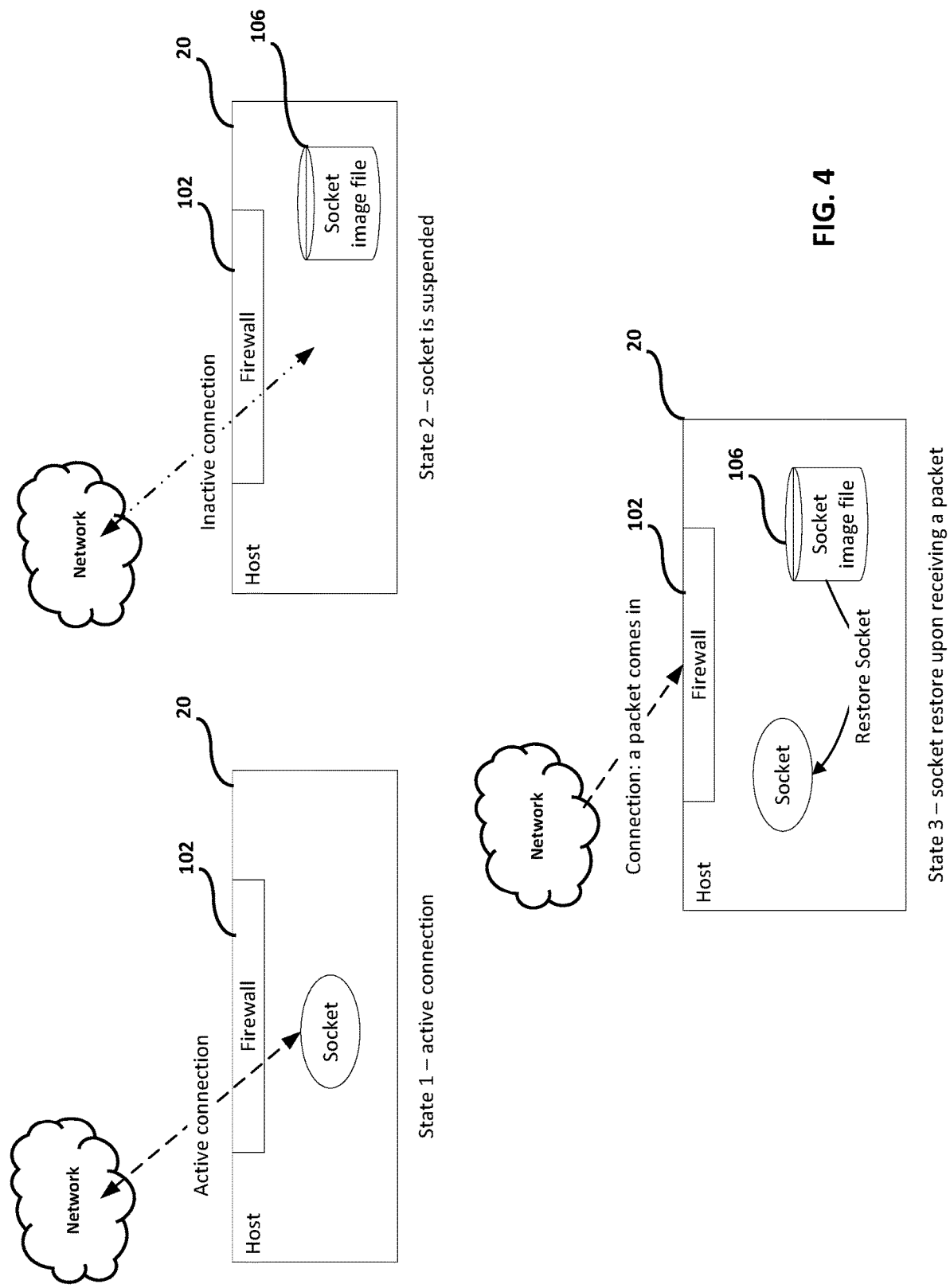
FIG. 4 is another illustration of the system involved in suspending and reactivating of a socket.

FIG. 4 is another illustration of the system involved in suspending and reactivation of a socket. In FIG. 4, state 1 on the upper left represents an active connection where a socket is expected to receive packets from its counterpart on the client's side. State 2 in the upper right represents the case of a suspended socket, where its state is saved in the image file 106. State 3 on the bottom of the figure represents the restoration of the socket from image file, e.g. when a packet comes in from the network.

In order to save the state of the socket to the image file, the following steps may be used:

(a) lock packet from a client for the specific connection (meaning, block it from that connection, using a firewall or some similar mechanism)

(b) turn TCP socket into "repair" mode (e.g. a socket is switched into a special mode, in which any action performed on it does not result in anything defined by an appropriate protocol actions, but rather directly puts the socket into a state, in which the socket is expected to be at the end of the successfully finished operation.)

(c) create the image file (d) read crucial connection parameters from the socket and save them into the image file. The parameters include 2 addresses (sender and receiver), 2 ports, sequences of read and write queues, and optionally negotiated handshake-time (e.g. window scale factor), contents of the read queue and unsent write queue, etc.

(e) close socket and remove it from hash table(s) or data structures.

To recover the socket from the image file, the following steps may be used:

(a) create new TCP socket;

(b) turn new socket into repair mode;

(c) open image file, read connection parameters from it and force the parameters into the socket in question. This means putting the values into the socket without starting any packet exchange that might be required according to TCP specification. At that time, the socket gets hashed back into the hash table (or data structure).

(d) plut the socket into a regular state;

(f) unlock packet flow.

Figure 5:
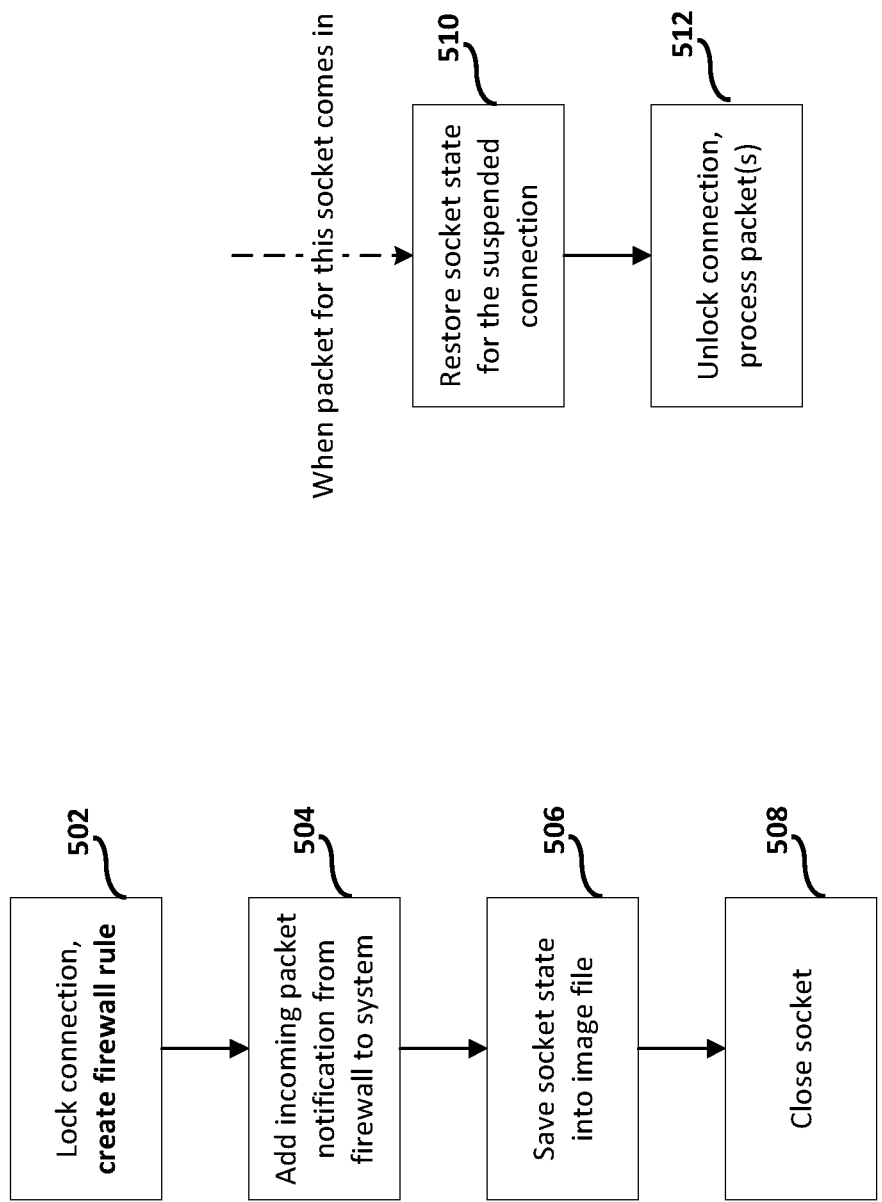
FIG. 5 illustrates the process steps involved in suspending and reactivating of sockets according to the exemplary embodiment.

FIG. 5 illustrates the process steps involved in suspending/restoring sockets according to the present invention. As shown in FIG. 5, in step 502, the connection (that was considered inactive) is locked and the firewall rule is created for that socket. (Connection is locked, means that the socket does not send or receive packets, e.g. the firewall blocks the packets.) In step 504, the firewall is told (this can be at least a part of the firewall rule) to sent notifications to the server about incoming packets directed to the socket. In step 506, the socket (corresponding to that inactive connection) the state is saved into an image file. In step 508, the socket is closed (it is deleted from the hash table, and also the kernel object representing this socket is deleted) and is now what we call "suspended" (but no notification is sent to the client). In step 510, when the analyzing block decided that the socket should be restored, for example when a packet for the socket comes in, the firewall gets this packet, sends a notification to the system and the state of the socket is restored from the image file. In step 512, the connection is unlocked (meaning, the firewall (or any other component) no longer blocks packets from that connection), and the packets are transferred to the socket and are processed.

Figure 6:
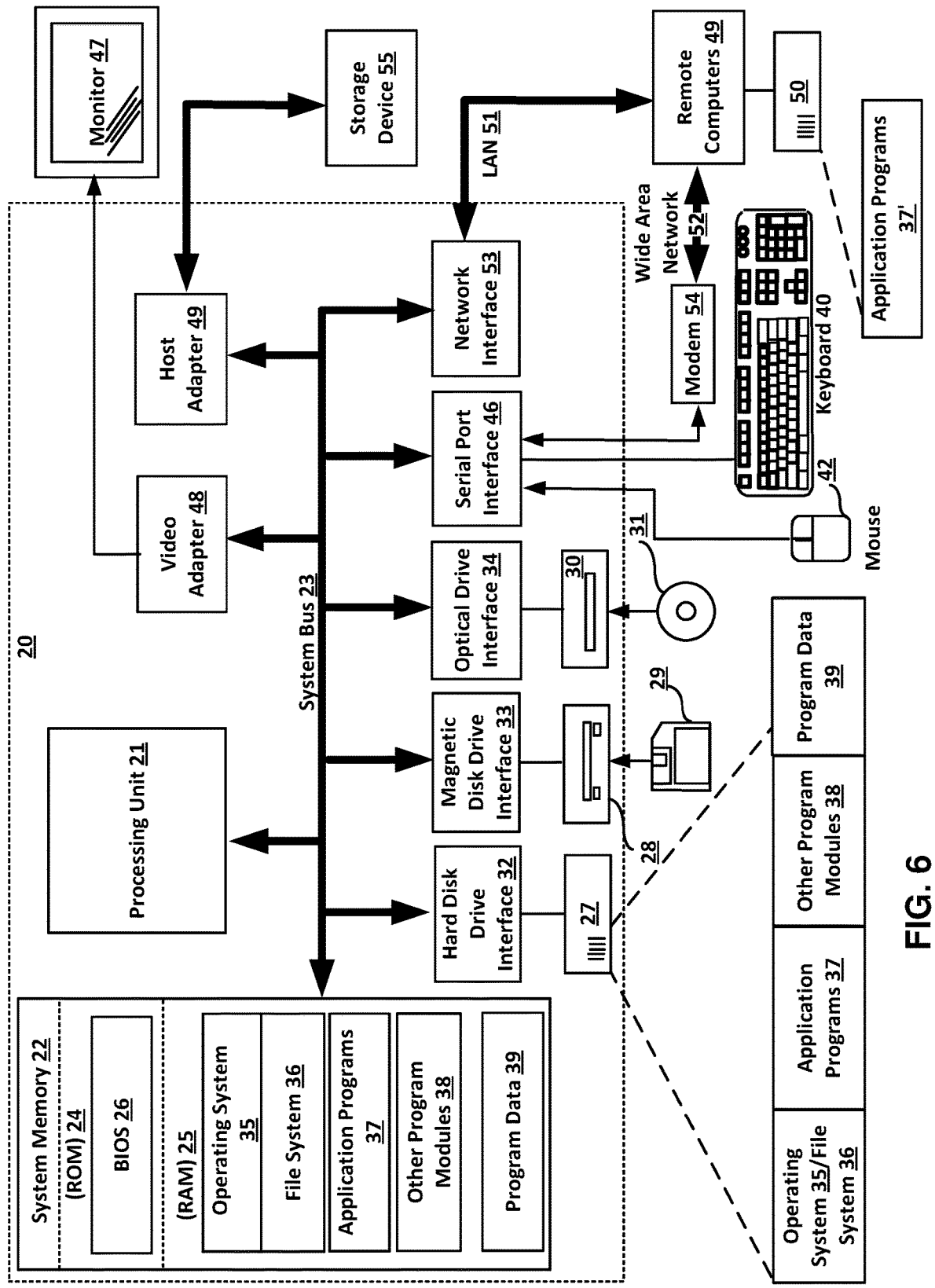
FIG. 6 illustrates a schematic of an exemplary computer system or server that can be used for implementation of the invention.

With reference to FIG. 6, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

What is claimed is:

1. A computer-implemented system for network socket management, the system comprising:
a host having a plurality of sockets and a data structure storing data on network connections corresponding to the sockets;
a socket image file that stores a state of each suspended socket,
wherein a socket is suspended when an analyzer module determines that the socket is a candidate for suspension based on connection behavior or socket behavior,
wherein a network connection corresponding to the suspended socket is maintained open without removing the corresponding socket from the data structure while a corresponding kernel object is deleted, and without informing a connection counterparty of a change in socket status; and
a filter that monitors incoming packets and restores suspended sockets to active status based on input from the analyzing module that is based on the connection behavior or the socket behavior.

2. The system of claim 1, wherein the filter uses a connection ID and is implemented as a hardware front end.

3. The system of claim 1, wherein the socket image file stores port-address pairs and network buffer contents for the suspended sockets.

4. The system of claim 1, wherein the socket image file stores TCP connection parameters for the suspended sockets.

5. The system of claim 1, wherein the socket is suspended when no packets are received on its corresponding connection for a predetermined period of time.

6. The system of claim 1, wherein a socket is suspended based on a predefined priority.

7. The system of claim 1, wherein a socket is suspended based on a least recently used algorithm applied to all the sockets to determine inactivity.

8. The system of claim 1, wherein the socket is suspended when its data rate is lower than all the other sockets.

9. The system of claim 1, wherein the socket is suspended when a DDOS attack is detected.

10. The system of claim 1, wherein the socket is suspended based on its port number, when a range of ports is suspended.

11. The system of claim 1, wherein a suspended socket is removed from the data structure used to search for a socket.

12. The system of claim 1, wherein the system does not initiate a closing of a connection when the connection is inactive.

13. The system of claim 1, wherein objects corresponding to the suspended sockets are removed from the data structure are released or freed for other use.

14. The system of claim 1, wherein the data structure is any of a hash table, a tree, a B-tree, an RB tree, a radix tree, an AVL tree), and a flat list.

15. The system of claim 1, wherein memory allocated to the suspended socket is freed up.

16. The system of claim 1, wherein, for a suspended socket, no information is sent to the client to indicate that the connection has changed, a process of closing the connection is not initiated.

17. The system of claim 1, wherein the socket is restored when a packet for the suspended socket is received.

18. The system of claim 1, wherein the filter is implemented as part of a firewall.

19. The system of claim 18, wherein the sockets, the firewall and the socket image file are all maintained in user space.

20. A computer-implemented method for network socket management, the method comprising:
   on a host having a plurality of sockets and a data structure storing data on network connections corresponding to the sockets, storing a socket image file that stores a state of each suspended socket;
   suspending a socket when an analyzer module determines that the socket is a candidate for suspension based on connection behavior or socket behavior;
   maintaining a network connection corresponding to the suspended socket open without removing the corresponding socket from the data structure, while a corresponding kernel object is deleted, and without informing a connection counterparty of a change in socket status; and
   monitoring incoming packets using a filter and restoring suspended sockets to active status based on input from the analyzing module that is based on the connection behavior or the socket behavior.

21. The method of claim 20, wherein the socket is restored when the analyzing block detects an incoming packet for the socket comes in.

22. The method of claim 20, wherein the socket is restored preemptively when resources are available.

* * * * *